United States Patent
Saffman et al.

(10) Patent No.: US 11,575,860 B2
(45) Date of Patent: Feb. 7, 2023

(54) OPTICAL CONTROL OF QUBITS WITH SPATIAL LIGHT MODULATORS FOR QUANTUM COMPUTING AND QUANTUM SIMULATION

(71) Applicants: Wisconsin Alumni Research Foundation, Madison, WI (US); ColdQuanta, Inc., Madison, WI (US)

(72) Inventors: Mark Saffman, Madison, WI (US); Trent Michael Graham, Madison, WI (US); Robert Sylvester Williamson, III, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 289 days.

(21) Appl. No.: 16/859,743

(22) Filed: Apr. 27, 2020

(65) Prior Publication Data
US 2021/0337171 A1    Oct. 28, 2021

(51) Int. Cl.
| | |
|---|---|
| H04N 9/31 | (2006.01) |
| G06N 10/00 | (2022.01) |
| G06E 3/00 | (2006.01) |
| B82Y 20/00 | (2011.01) |
| B82Y 10/00 | (2011.01) |

(52) U.S. Cl.
CPC .............. H04N 9/312 (2013.01); G06E 3/00 (2013.01); G06N 10/00 (2019.01); H04N 9/3152 (2013.01); B82Y 10/00 (2013.01); B82Y 20/00 (2013.01)

(58) Field of Classification Search
CPC ...... H04N 9/312; H04N 9/3152; G06N 10/00; G06E 3/00; B82Y 10/00; B82Y 20/00
USPC .......................................................... 359/107
See application file for complete search history.

(56) References Cited

U.S. PATENT DOCUMENTS

| | | |
|---|---|---|
| 5,061,049 A | 10/1991 | Hornbeck |
| 9,355,750 B2 | 5/2016 | Saffman |
| 10,504,033 B1 | 12/2019 | King |
| 10,559,392 B1 | 2/2020 | Saffman |
| 11,120,360 B2 | 9/2021 | Kim |
| 2006/0179029 A1* | 8/2006 | Vala ........................ G06N 10/00 706/62 |
| 2019/0165246 A1 | 5/2019 | Rosenblatt |
| 2020/0033511 A1* | 1/2020 | Kim ............................ G02F 1/33 |
| 2021/0166147 A1 | 6/2021 | Kim |

OTHER PUBLICATIONS

Barredo, D. et al, An atom-by-atom assembler of defect-free arbitrary 2D atomic arrays, Science 354, 1021 (2016).
(Continued)

Primary Examiner — Tu-Tu V Ho
(74) Attorney, Agent, or Firm — Quarles & Brady LLP (57) ABSTRACT

Systems and methods for the optical control of qubits and other quantum particles with spatial light modulators (SLM) for quantum computing and quantum simulation are disclosed herein. The system may include a particle system configured to provide an ordered array comprising a multiplicity of quantum particles or a multiplicity of qubits, an optical source, a SLM configured to project a structured illumination pattern capable of individually addressing one or more quantum particles or qubits of the ordered array, and a SLM controller.

18 Claims, 4 Drawing Sheets

(56) References Cited

OTHER PUBLICATIONS

Bartlett, T.A. et al. Adapting Texas Instruments DLP technology to demonstrate a phase spatial light modulator. In Emerging Digital Micromirror Device Based Systems and Applications XI (vol. 10932, p. 109320S). International Society for Optics and Photonics (2019).

Bechtold, P. et al, "Evaluation of disparate laser beam deflection technologies by means of number and rate of resolvable spots," Opt. Lett. 38, 2934 (2013).

Floyd R. et al, "An Adaptive Algorithm for Spatial Grayscale", Proc. Soc. Inf. Disp. 17, 75-77 (1976).

Gaunt A.L. et al, "Robust Digital Holography for Ultracold Atom Trapping", Sci. Rep. 2, 721 (2012).

Gerchberg R.W. et al, "A practical algorithm for the determination of the phase from image and diffraction plane pictures," Optik 35, 237 (1972).

Gillen-Christandl, K. et al. Comparison of Gaussian and super Gaussian laser beams for addressing atomic qubits. Applied Physics B, 122(5), 131 (2016).

Knoernschild, C. et al, "Independent individual addressing of multiple neutral atom qubits with a micromirror-based beam steering system," Appl. Phys. Lett. 97, 134101 (2010).

Pasienski, M. et al. A high-accuracy algorithm for designing arbitrary holographic atom traps. Optics express, 16(3), pp. 2176-2190 (2008).

Piotrowicz, M. J. et al. Two-dimensional lattice of blue-detuned atom traps using a projected Gaussian beam array. Physical Review A, 88(1), 013420 (2013).

Stuart, D. et al, "Single-atom trapping and transport in DMD-controlled optical tweezers," New J. Phys. 20, 023013 (2018).

Stuart, D. et al. Fast algorithms for generating binary holograms. arXiv preprint arXiv:1409.1841 (2014).

International Searching Authority. International Search Report and Written Opinion for application PCT/US2021/029349, dated Aug. 4, 2021. 11 pages.

Martin-Badosa, E., et al. "Design strategies for optimizing holographic optical tweezers setups." arXiv: physics/0701037 (Jun. 18, 2007). Online https://arxiv.org/abs/physics/0701037.

\* cited by examiner

OPTICAL CONTROL OF QUBITS WITH SPATIAL LIGHT MODULATORS FOR QUANTUM COMPUTING AND QUANTUM SIMULATION

STATEMENT REGARDING FEDERALLY SPONSORED RESEARCH

This invention was made with government support under 1720220 awarded by the National Science Foundation. The government has certain rights in the invention.

FIELD OF THE INVENTION

The disclosed technology is generally directed to quantum computing and quantum simulation. More particularly the technology is directed to systems and methods of optically controlling qubits with spatial light modulators.

BACKGROUND OF THE INVENTION

There has been a rapid increase of interest regarding arrays of trapped qubits. Such arrays are ideally suited for creating a large number of qubits and are a promising platform for quantum computing. A precise and efficient means of controlling optical fields is required for many steps in addressing an array of particles for quantum computing. Several device technologies that can be used for controlling optical fields to address particles include acousto-optic modulators, electro-optic modulators, galvanometer mirrors, and grating light valves. These different approaches may be compared by their optical efficiency, scan/update time, and number of resolvable image spots. In general, there is a trade off in terms of a time-bandwidth product. The number of resolvable spots times the scan/update rate (inverse of the scan/update time) is limited.

Optical control has previously been accomplished using acousto-optic modulators (AOMs) to scan the control beam between optical trap sites. While such techniques might be extended for much larger arrays, they are ultimately limited by the speed at which an AOM can scan the control beam from site to site, which is limited by the size of the beam in the AOM. The beam diameter needs to be small within the AOM crystal to achieve fast switching between sites (limited by the acoustic wave propagation speed). This must be balanced against the fact that a large beam waist within the AOM is required to provide sufficient angular resolution in order to individually address each site in the array of traps. These properties together limit the total number of array sites, each of which may contain a qubit that an AOM scanner can effectively address.

In addition, AOM scanning can only address a single array site at a time. While an AOM can be driven with a multi-frequency electronic signal to address multiple sites simultaneously, the light that is scanned to each site will have a different frequency, with the frequency difference proportional to the lateral scan distance. This restriction limits the possibilities of performing multi-qubit gates and parallel single-qubit gate operations. As a result, there is need for systems and methods for individually and simultaneously addressing multiple quantum particles or qubits in these arrays.

BRIEF SUMMARY OF THE INVENTION

Disclosed herein are systems and methods for the optical control of qubits and other quantum particles with spatial light modulators (SLM) for quantum computing and quantum simulation.

One aspect of the invention includes systems for the optical control of a quantum particle or qubit. The system may comprise a particle system configured to provide an ordered array comprising a multiplicity of quantum particles or a multiplicity of qubits, an optical source configured to generate a beam of light, an SLM configured to project a structured illumination pattern capable of individually addressing one or more quantum particles or qubits of the ordered array, and an SLM controller configured to modulate the structured illumination pattern. In some embodiments, the SLM comprises a hologram projector and an intensity transmission mask.

In some embodiments, the SLM controller is configured to modulate the structured illumination pattern to induce a qubit operation. In some embodiments, the SLM controller is configured to modulate the structured illumination pattern to simultaneously address two or more quantum particles or qubits of the ordered array. In some embodiments, the SLM controller is configured to modulate the structured illumination pattern to induce a change in a profile of the structured illumination pattern incident on the individually addressed one or more quantum particles or qubits. In some embodiments, the SLM controller is configured to modulate the structured illumination pattern to correct an optical aberration. In some embodiments, the SLM controller is configured to modulate the structured illumination pattern to transport one or more quantum particles or qubits across the ordered array. In some embodiments, the SLM controller is configured to modulate the structured illumination pattern to induce a quantum state transition in one or more quantum particles or qubits in the ordered array. In some embodiments, the SLM controller is configured to modulate the structured illumination pattern to induce a change in a quantum state transition frequency in one or more quantum particles or qubits in the ordered array. In some embodiments, the SLM controller is configured to modulate the structured illumination pattern to induce a phase shift in one or more quantum particles or qubits in the ordered array. In some embodiments, the SLM controller is configured to modulate the structured illumination pattern to induce a rotation in one or more quantum particles or qubits in the ordered array. In some embodiments, the SLM controller is configured to modulate the structured illumination pattern to accomplish any combination thereof.

Another aspect of the invention includes quantum computing systems comprising any of the systems for optical control described herein and a readout system for providing a quantum computation result.

Another aspect of the invention includes a method for optically controlling a quantum particle or a qubit. The method may comprise projecting, with a spatial light modulator positioned along an optical train between the optical source and an ordered array comprising a multiplicity of quantum particles or a multiplicity of qubits, a structured illumination pattern capable of individually addressing one or more quantum particles or qubits of the ordered array. The method may also comprise modulating, with a spatial light modulator controller, the structured illumination pattern. Suitably, the method may be performed with any of the systems for optical control described herein.

Another aspect of the invention includes a method for performing a quantum computation comprising any of the methods for optical control described herein and further comprising providing a quantum computation result.

These and other aspects of the invention will be further described herein.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Disclosed herein are systems and methods for the optical control of qubits and other quantum particles with spatial light modulators (SLM) for quantum computing and quantum simulation. The present technology uses spatial light modulators to structure light fields to achieve a high level of optical control for a variety of tasks and applications related to quantum computing. The systems and methods presented herein allow quantum particles and qubits within an ordered array to be individually addressed with incident light.

The disclosed systems and methods are superior to existing methods for optical control of qubits. In one aspect, the systems and methods disclosed herein allow for many qubits to be simultaneously controlled. In another aspect, the systems and methods disclosed herein allow for shaping of the control beam at each qubit site to reduce errors in quantum gate operations. In yet another aspect, the systems and methods disclosed herein allow for correction of distortions or aberrations in the optical system used to project light onto qubits. Moreover, the foregoing advantages of the disclosed systems and methods may be utilized in combination.

The systems and methods described herein have a wide application to several qubit control or gate operations. Electromagnetic fields of use for qubit control can be broadly divided into optical fields with wavelengths less than 10 microns and microwave fields with wavelengths longer than 1 mm. Gate operations may involve microwave fields alone, microwave fields combined with optical fields, or optical fields alone. The systems and methods disclosed herein may be used for any quantum gate operations involving microwave and optical fields acting together or optical fields alone. Exemplary qubit gates include optical X or Y Raman gates, optical Stark shifted Z gates, optically Stark-shifted microwave gates, and any gates involving Rydberg excitation of atoms or ions. Applying the systems and methods disclosed herein, it is possible to illuminate both control and target atom simultaneously for some gate protocols.

Disclosed herein are systems for the optical control of a quantum particle or qubit. "Quantum particle" refers to a discrete unit possessing quantized states, such as quantized electronic states, vibrational states, rotational states, spin states, and the like. Exemplary quantum particles include photons, electrons, nuclei, atoms, ions, quantum dots, spin defects in solids, and so forth. In particular embodiments, the quantum particles comprise neutral atoms.

"Qubit" refers to multi-level quantum-mechanical system capable of use in quantum information processing. The qubit may be composed to one or more quantum particles. In contrast to classical computational methods that rely on binary data stored in the form of definite on/off states, or classical bits, qubits take advantage of the quantum mechanical nature of quantum systems to store and manipulate data. Specifically, quantum systems can be described by multiple quantized energy levels or states and can be represented probabilistically using a superposition of those states.

Because of this complex encoding, quantum computing and quantum simulation require very precise control and manipulation of quantum information. Furthermore, this complex encoding makes error correction techniques much more difficult for quantum computers. This difficulty necessitates a large number of ancillary qubits for error correction.

In addition to individual quantum particle or qubit manipulations, a complete set of quantum operations requires two-qubit interactions (i.e., interactions where the state of one qubit affects the state of another) or multi-qubit interactions (i.e., interactions between three, four, or more qubits).

As is required of single-qubit quantum gates or individual quantum particle manipulations, it is important to be able to individually address one or more quantum particles or qubits in the array without affecting neighboring quantum particles or qubits. As with optical trapping, the manipulation of the qubit states for quantum computing requires precisely structured illumination by optical fields.

As a result, the state of a control qubit can be used to influence the state of one or more target qubits. These requirements highlight the need for careful control of optical fields to allow for a multiplicity of trapped quantum particles and qubits to be manipulated for quantum computation and simulation.

Figure 1:
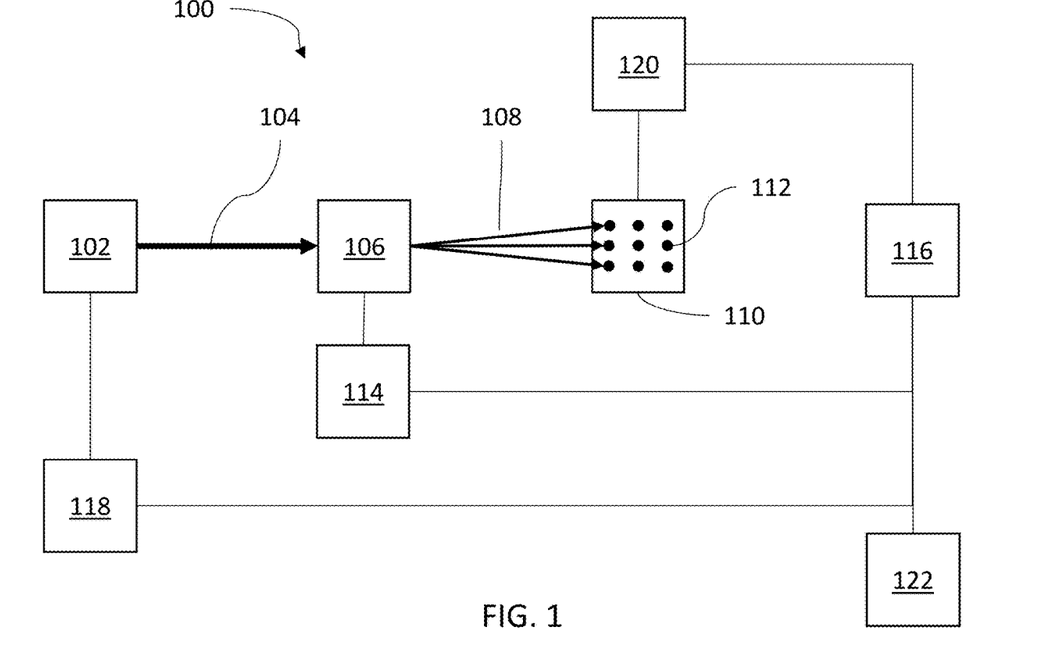
FIG. 1 illustrates a system for the optical control of a quantum particle or qubit.

One aspect of the invention is systems for optically controlling a quantum particle or qubit. FIG. 1 illustrates such a system 100 that comprises an optical source 102, an SLM 106, a spatial light modulator controller 114, and particle system 110 comprising an ordered array of quantum particles or qubits 112. In some embodiments, the system 100 further comprises one or more additional components. These one or more additional components may include a detector 116, optical source controller 118, particle system controller 120, input/output (I/O) device 122, or any combination thereof.

The system 100 may also include a variety of other hardware and optical elements for directing, transmitting, modifying, focusing, dividing, modulating, and amplifying generated light fields to various shapes, sizes, profiles, orientations, polarizations, and intensities, as well as any other desirable properties. The system 100 may also include other optical elements, such as various beam splitters, beam shapers, shapers, diffractive elements, refractive elements, gratings, mirrors, polarizers, modulators and so forth. These optical elements may be positioned between the optical source 102 and SLM 106, and/or after the SLM 106 along the optical train.

In addition, the system 100 can optionally include other capabilities, including hardware control of or interrogation of quantum states of particles configured and arranged in accordance with the present disclosure. Such capabilities facilitate applications including quantum computation, and so forth. These, along with other tasks, may optionally be performed by one or more controllers shown in FIG. 1.

The optical source 102 is configured to generate a beam of light 104. The optical source 102 may include various hardware for generating the beam of light 104. In particular, the optical source 102 may be configured to generate light with various frequencies, wavelengths, power levels, spatial profiles, temporal modulations (e.g. periodic or aperiodic), and so on.

In one embodiment, the optical source 102 includes a laser capable of producing light with a desired wavelength. The wavelength may be in an ultraviolet, visible, or infrared range, but need not be. Suitably, the light is between approximately 200 nm and approximately 1000 nm, although other wavelengths are possible. In another embodiment, the optical source 102 includes multiple lasers operated at one or more different frequencies. In some embodiments, the frequency separation between the lasers may be configured to target different quantum particles or qubits and/or induce a multi-photon effect in a quantum particle or qubit.

In some aspects, the optical source 102 may be configured to generate light fields using frequencies shifted from at least one quantum transition resonance of the quantum particle or qubit 112 within the particle system 110. For example, the optical source 102 may be configured to generate blue-detuned or red-detuned light, where the amount of detuning may depend upon the species of quantum particle or qubit. As an example, the detuning may be up to 100 nm, 500 nm, 1000 nm, 1500 nm, or 2000 nm. The detuning may be as small as 0.1 pm.

In some aspects, the optical source 102 may be configured to generate light fields capable of inducing a quantum state transition in the quantum particle or qubit 112 within the particle system 110. The quantum state transition may transfer population between two states of the quantum particle or qubit, e.g., between a ground state $|0\rangle$ and an excited state such as $|1\rangle$. In other embodiments, the quantum state transition may transfer population between a state of the quantum particle or qubit and a virtual or imaginary state. Suitably, the optical source 102 may be configured to induce a quantum state transition when the frequency of the light generated by the optical source is resonant or near resonant with the desired transition. Exemplary quantum state transitions include Rydberg excitations, Raman transitions, or between states used for qubit encoding and other low energy states.

In one embodiment, targeted quantum particles or qubits are illuminated with light of two frequencies detuned from a transition. If the difference of the two frequencies is tuned to the energy splitting between the states, the targeted atoms may transfer their population between the two states.

In another embodiment, the quantum particle or qubit is excited through a single-photon excitation, a two-photon excitation, a three-photon excitation, or so forth. Such excitations can be reached through resonant driving, adiabatic rapid passage, stimulated Raman adiabatic passage, or by using pulses with specially designed temporal envelopes to increase gate fidelity.

In some aspects, the optical source 102 may be configured to generate light fields capable of inducing a change in a quantum state transition frequency. In contrast to the transitions discussed above, the structured illumination pattern can be used to perturb the energy levels of a quantum particle or qubit 112 of the particle system 110, thereby causing a change in the transition frequency between the states. The change of the transition frequency between states may allow for the targeted quantum particle or qubit to move into or out of resonance. In some embodiments, the light fields are capable of generating a Stark effect. A Stark effect is the shifting or splitting of quantum states due to the presence of an external electric field, such as light detuned from a transition frequency.

In some aspects, the optical source 102 may be configured to induce a phase shift. In some embodiments, the phase shift may be induced between two quantum particle or qubit states without population transfer. This may be accomplished by illuminated the targeted quantum particles or qubits with light detuned from an atomic transition. A Stark effect may result in the targeted site accumulating a phase with respect to the other quantum particles or qubits of the ordered array.

In some aspects, the optical source 102 may be configured to inducing a rotation. For example, Stark-shifted microwave rotations can also be used to accomplish site-specific qubit rotations. Microwaves tuned to the energy splitting between states will induce population rotations. By addressing targeted atoms with light detuned from an atomic transition, the energy splitting between the states changes due to the Stark effect. This will shift targeted sites out of resonance with the microwave transition, resulting in all atoms in the lattice undergoing rotations except those in the targeted sites. Alternately, by tuning the microwave frequency to the Stark-shifted energy difference of the two qubit states, it is possible to induce population transfer on targeted sites only.

In some aspects, the optical source 102 may be configured to inducing a qubit operation. Exemplary qubit operations include, without limitation, optical X or Y Raman gates, optical Stark shifted Z gates, optically Stark-shifted microwave gates, and any gates involving Rydberg excitation of atoms or ions, amongst others.

In some aspects, the optical source 102 may be configured to transport one or more quantum particles or qubits across an ordered array of quantum particles or qubits. Transport of the quantum particle or qubit may be accomplished by using the generated light to create an optical potential that induces the quantum particle or qubit to move from one site of the ordered array to another site of the ordered array.

The SLM 106, positioned downstream from the optical source 102 along the optical train, is configured to project a structured illumination pattern 108. The SLM may be a spatially varying amplitude modulator or a spatially varying phase modulator and the beam of light 104 incident on the SLM 106 will be diffracted by an array of reflective elements that can be used to project the structured illumination pattern 108 efficiently onto either a single or multiple array sites. Exemplary SLMs that may be used for such a purpose include, but are not limited to, digital micromirror device (DMD), piston-type DMD, liquid-crystal-based SLM, deformable mirror array, or any combination thereof.

As is required for a number of different applications, it is important to be able to individually address one or more quantum particles or qubits within an ordered array without affecting neighboring sites. As with optical trapping of the qubits, the manipulation of the qubit states for quantum computing requires precisely structured illumination of the quantum particles or qubits by optical fields. Similar techniques can be applied to a number of quantum computing frameworks which use ions, molecules, and quantum dots, spin defects in solids, as well as any other qubit implementation that can be controlled with optical fields.

Figure 2:
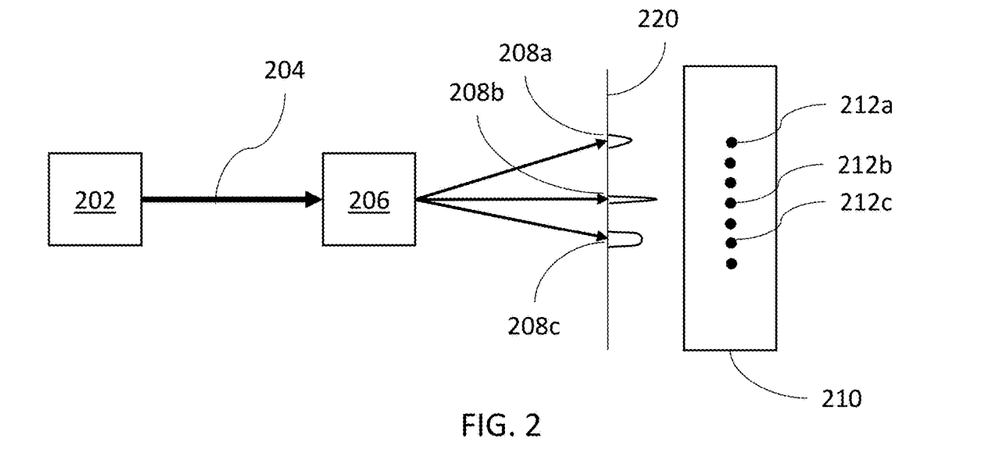
FIG. 2 illustrates a structured illumination pattern projected onto an ordered array.

A "structured illumination pattern" refers to a unimodal or multimodal spatial intensity profile or beam profile of light that has been structured by the spatial light modular to be different from the spatial intensity profile or beam profile of the beam of light incident on the spatial light modulator. FIG. 2 presents an exemplary representation of a structured illumination pattern 208 incident on an exemplary one-dimensional row of quantum particles or qubits 212 of a particle system 210. Although the array is illustrated as a one-dimensional array for clarity, the array may be two- or three dimensional as well. As shown by way of example in FIG. 2, the beam of light 204 projected by an optical source 202 and incident on the SLM 206 is structured to have three diverging projections (208a, 208b, and 208c) of light forming the of the structured illumination pattern 208. As represented in FIG. 2, the structured illumination pattern 208 is a multimodal distribution having three spatial intensity maxima (208a, 208b, and 208c) projected onto a fictitious plane 220 that individually address three different quantum particles or qubits (212a, 212b, 212c, respectively) of one-dimensional row of quantum particles or qubits 212 of particle system 210. "Individually address" or "individually addressing" refers to a spatial intensity profile where one or more modes interacts with an individual quantum particle or qubit. As shown in FIG. 2, it is possible to have a structured illumination pattern 208 that is capable of individually addressing a multiplicity of quantum particles or qubits simultaneously. The structured illumination pattern 208 may have any suitable spatial intensity profile or beam profile for performing the operation or application of interest.

As illustrated in FIG. 2, various parameters that characterize the spatial intensity profile of a mode may be modulated. Each of the three exemplary modes (208a, 208b, and 208c) of the multimodal are intentionally characterized has having different spatial intensity profiles. Exemplary parameters that may be varied include, without limitation, the beam profile, the maxima of intensity, the beam width, beam quality, beam divergence, beam astigmatism, beam jitter, and so forth. Although some or all of the modes may have different spatial intensity profiles, they need not be.

To address a quantum particle or qubit, light can be focused down to a small spot that illuminates the target site without affecting neighboring sites. However, because a quantum particle or qubit is not perfectly localized in the atom trap due to finite temperature effects, a tightly focused beam will not provide perfectly uniform illumination over the trap. In addition, tightly focused beams are also very sensitive to small changes in the alignment of the optical field relative to the trap. To combat these sensitivities, it is possible to shape the focused beam to have a much slower intensity variation near the center of the focus and reduce the sensitivity of the addressed quantum particle or qubit to finite temperature effects and misalignment. Suitably, the mode(s) of the structured illumination pattern 208 may have a shaped cross-sectional intensity profile which has an extended area of uniform intensity over the trapping region or to address quantum particles or qubits, including, without limitation, flat-top, Gaussian, super-Gaussian, Fermi-Dirac, Bessel beam, or other spatial intensity or beam profiles.

The SLM may comprise an intensity transmission mask. The intensity transmission mask allows for the filtering of light to project the structured illumination pattern to the desired site(s) of the ordered array. Intensity transmission masks may comprise amplitude modulators. An exemplary amplitude modulator is a DMD. This device consists of an array of micrometer-scale mirrors which can be deflected to redirect incident light towards or away from a target. With spatial filtering to remove light deflected away from the target, a DMD acts as a space-variant binary amplitude modulator. Current DMDs have a very high switching speed and can switch between different patterns at rates as high as 32 kHz. Such DMD devices are typically used as high-resolution light projectors. In this mode, the light on the micromirror device is filtered and imaged onto a target. If the DMD is uniformly illuminated, then the pattern of light on the target corresponds to the pattern of mirrors directing the light at the target. This projection mode can be used to address an array of qubits by having different sections of the DMD associated to particular sites in the array. To address a particular site or combination of sites, the sections corresponding to the targets are set to the "on" position. The flexibility of addressing a large number of qubit sites in a one-, two-, or three-dimensional array, without imparting site dependent frequency shifts to the light appears to be unique to the SLM technology.

While this configuration can be used to effectively address a large number of array sites with little crosstalk or intensity on untargeted sites, it does not scale well to large arrays since the power is divided among all the sites. Since usually only a few sites are targeted at once for most gate-mode quantum algorithms, almost all light incident on the DMD reflects off mirrors in the "off" state.

The SLM may comprise a hologram projector configured to project a holographically-structured illumination pattern. Using the SLM as a hologram projector efficiently uses the power of the beam of light but may introduce unacceptable crosstalk. When the SLM comprises a hologram projector, the SLM may be placed in the Fourier plane relative to the ordered array and illuminated by a plane wave. An amplitude or phase pattern may be written onto the SLM to generate an optical hologram which, after Fourier transformation by an additional lens, illuminates one or more sites of the ordered array. The profile of the beam focused onto each site can be Gaussian, flat-topped, or any other desired profile.

The DMD described above may be used as a binary amplitude hologram projector. In this configuration, a system of lenses is used to image the conjugate Fourier transform plane of the light incident on the DMD surface onto the sites of the ordered array. Since the DMD is acting as a hologram projector, approximately half of the DMD mirrors are in the "on" state even when addressing any number of targeted particles allowing for much more efficient use of the incident light. Despite this improved efficiency, binary amplitude holograms are not as efficient as phase holograms; approximately half of the light incident on the DMD surface will reflect from mirror elements in the "off" state. Approximately 10% of light incident on the DMD is actually diffracted into the +1 hologram order towards the targeted array sites; the rest of the light remains in the 0 or −1 hologram orders or is incident on DMD mirrors in the "off" state. When using the DMD as a hologram projector, care must be taken both to balance the light evenly between targeted array sites and to prevent crosstalk on other array sites resulting from diffraction artifacts. There are several computer-generated hologram techniques for aiding these two goals; however, such techniques often come at the price of decreased diffraction efficiency.

In contrast to DMDs, phase SLMs are not binary but can have many different settings for each pixel. When used as phase hologram projectors, such SLMs intrinsically can be more efficient at directing light towards targeted array sites than amplitude hologram projectors for two reasons: (1) Light from all pixels can be directed towards the array region. (2) Almost all of the light can be diffracted into the +1 hologram order.

An exemplary phase SLM is a liquid-crystal-based SLM. The chief limitation of many phase SLMs, such as liquid-crystal-based SLMs, is that they cannot be switched between different settings very quickly (usually less than 200 Hz for liquid-crystal-based SLMs). For example, when such devices are used to perform site-selective quantum gates on an array of qubits, this low frame rate greatly limits the number of gates that can be performed before the qubit suffers decoherence.

Another exemplary phase SLM is a piston-type DMD device. Piston-type DMD devices allow for phase hologram projectors with frame rates comparable to other DMD devices. Such devices would allow both efficient and high-speed addressing of an array of particles.

Another exemplary phase SLM is a tilt-mode DMD that varies the tilting angle of each mirror of the mirror array. This enables the combination of phase and amplitude modulation to be imparted on the optical field.

Another exemplary phase SLM is a deformable mirror array that comprises a mirror membrane supported by an underlying actuator array. Each actuator in the array can be individually deflected by electrostatic actuation to achieve the desired pattern of deformation for preparing the structured illumination pattern. Suitably, the deformable mirror array may be a segmented deformable mirror array. Alternatively, the deformable mirror array may be a continuous deformable mirror array.

In addition to providing a means to address single or multiple particle trap sites, SLMs used as hologram projectors can be used to modify different characteristics of incoming beams. In particular, SLMs can be used to manipulate the profile of an incident optical beam, such as to compensate for aberrations in the imaging line, including correcting for defocus, spherical aberration, coma, astigmatism, as well as higher-order aberrations.

Referring again to FIG. 1, aberrations can be detected by a detector 116 by several different methods, e.g., measuring with a wavefront sensor or beam profiler. Once detected, aberrations can be communicated via any suitable communication conduit to a SLM controller 114 and, optionally, an optical source controller 118 and used be used to holographically modulate the structured illumination pattern 108 by applying a corrective phase map or any other suitable method, thereby correcting the aberration. Because the SLM already functions as a hologram projector, it is possible to incorporate aberration correction into the hologram without additional power losses.

In addition to correcting optical train aberrations, the SLM can also be used to modulate the local spatial mode of the control beam foci at each target lattice site. For example, one limitation of current neutral atom gate implementations arises from changes in control beam intensity of atoms due to misalignment and atomic motion. This variation in intensity causes a variation in the Rabi frequency, which in turn gives rise to gate errors. However, this intensity variation can be greatly reduced by changing the control beam focus shape so that it has a more uniform intensity at the focus, e.g., flat-top, super-Gaussian, Fermi-Dirac, Bessel beam, or other spatial intensity or beam profiles. As with optical train aberration correction, this modification can be implemented without an additional loss of control beam power.

Figure 3:
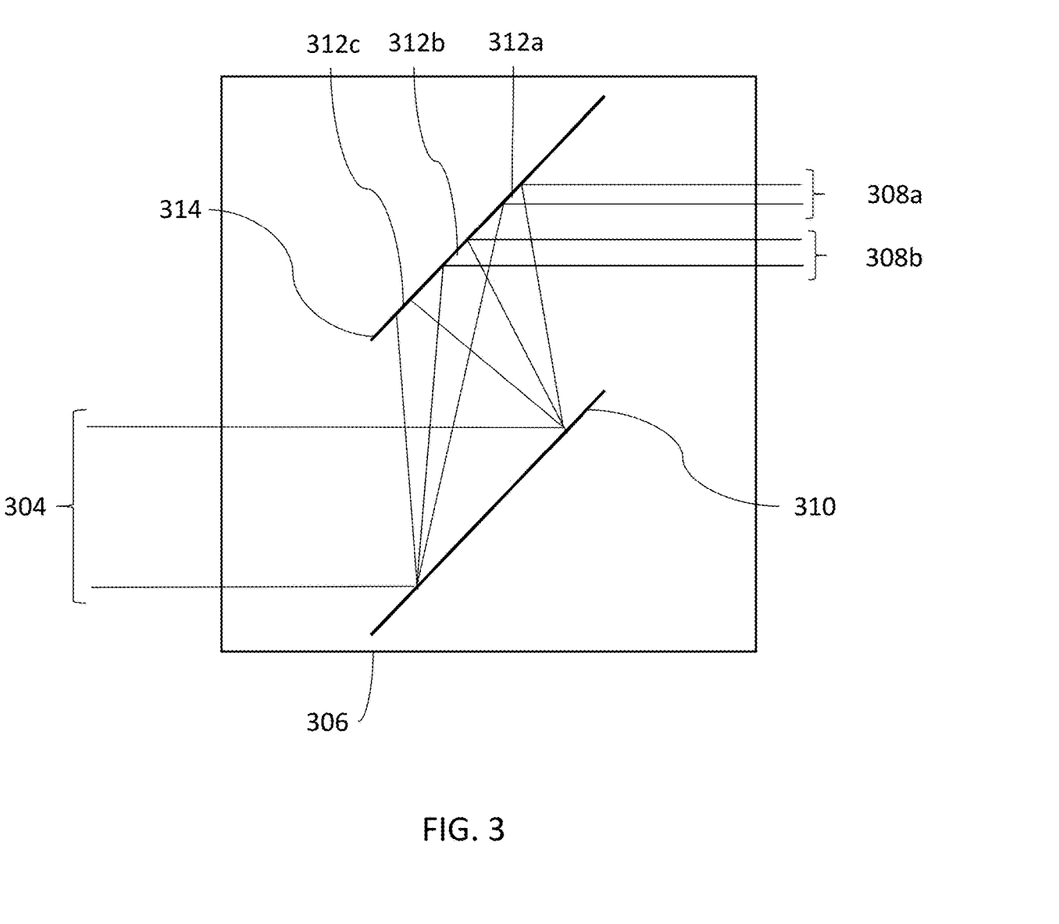
FIG. 3 illustrates an SLM comprising a hologram projector and an intensity transmission mask.

As illustrated in FIG. 3, an SLM 306 may comprise both a hologram projector 310 and an intensity transmission mask 314. The hologram projector 310 is configured to receive an incident beam of light 304 and project a holographically-structured illumination pattern (312a, 312b, and 312c) onto the intensity transmission mask 314. The intensity transmission mask 314 may filter the holographically-structured illumination pattern to project a structured illumination pattern 308a and 308b. As exemplified in FIG. 3, the intensity transmission mask 314 may filter a portion of the holographically-structured illumination matter such as 312a, thereby eliminating unwanted crosstalk. By using a single SLM in holographic mode and a second in transmission mode, it is possible to address single or multiple lattice sites with relatively high efficiency and very low crosstalk.

The systems and methods described herein may employ two or more SLMs or two or more different beams of light incident on the SLM. Moreover, the SLMs described herein may be adapted to operate both as both a hologram projector and an intensity transition mask. For example, the system may comprise a chromatic re-imaging system. By separating different wavelengths using dichroic mirrors, it is possible to provide negative or positive magnification to each individual wavelength. This may be accomplished by placing an imaging system on one wavelength and then recombining the two wavelengths on the same dichroic element. This functionality may also be incorporated into a single SLM combining piston and tilt mode operation.

Figure 4:
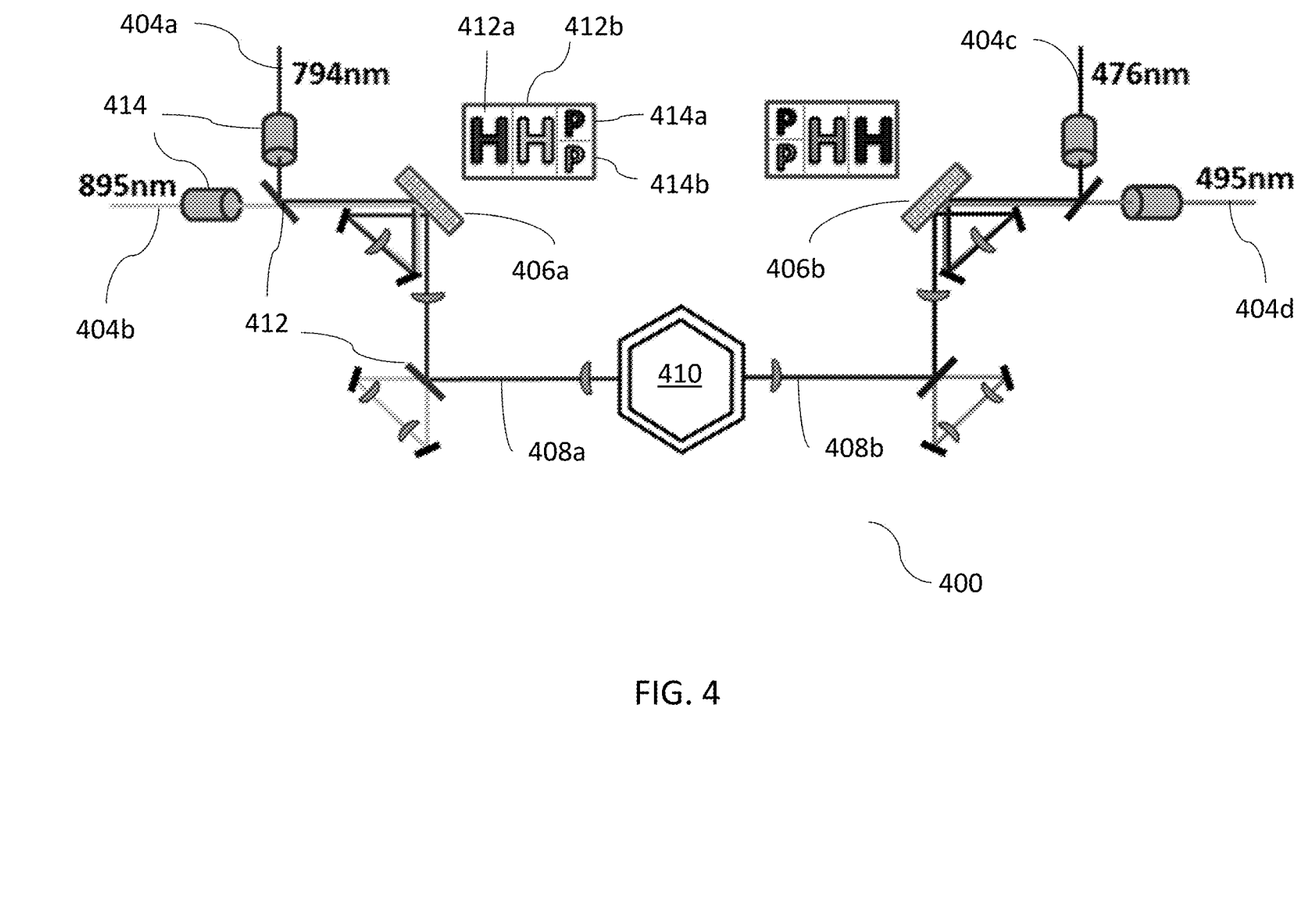
FIG. 4 illustrates a system for the optical control of a quantum particle or qubit using multiple frequencies of light.

A particular embodiment employing these features in combination is provided in FIG. 4, but these features may be used individually as well. As shown in FIG. 4, the system 400 comprises two different SLMs (406a and 406b) configured to receive a multiplicity of different beams of light (404a, 404b, 404c, and 404d).

As shown, each of the different beams of light have a different frequency. These wavelengths are shaped using two SLMs, one for each longer wavelengths 406a and another for the shorter wavelengths 406b. Each of the SLMs (406a and 406b) that are segmented or divided into four segments. Two of these segments of an SLM are used as a hologram projector (H) and two are used as an intensity transmission mask (P). Dichroic mirrors 412 are used to combine and separate the two wavelengths on each side for spatial mode matching. To achieve the required switching speed, fast switches 414 acting as a switch are placed upstream of the SLMs. Suitably the fast switch comprises an AOM, electro-optic modulator (EOM), or other suitable optical modulator.

As illustrated for SLM 406a, SLM 406a comprise a segmented SLM having a first segment comprising the hologram projector 412a capable of receiving incident beam of light 404a and projecting a holographically-structured illumination pattern. SLM 406a also comprises a second segment comprising the hologram projector 412b capable of receiving incident beam of light 404b and projecting a holographically-structured illumination pattern. SLM 406a also comprises a third segment comprising the intensity transmission mask 414a capable of receiving the holographically-structured illumination pattern projected by hologram projector 412a. Finally, the SLM 406a also comprises a third segment comprising the intensity transmission mask 414b capable of receiving the holographically-structured illumination pattern projected by hologram projector 412b. Each of the projections from the intensity transmission masks (414a and 414b) contribute to the structured illumination pattern 408a that irradiates the particle system 410 comprising the ordered array of quantum particles or qubits. Similarly, SLM 406*b* may be employed to provide structured illumination pattern 408*b*.

Although not specifically enumerated, the system 400 comprises a variety of other hardware and optical elements for directing, transmitting, modifying, focusing, dividing, modulating, and amplifying generated light fields to various shapes, sizes, profiles, orientations, polarizations, and intensities, as well as any other desirable properties. These and other hardware and optical elements may be employed depending on the desired application.

Referring again to FIG. 1, the particle system 110 may be configured to provide and control a number of quantum particles or qubits 112. Specifically, the particle system 110 may include various materials, gases and hardware configured to generate, transfer, manipulate and generally confine the particles. For example, the particle system 106 can include a vacuum system, and capabilities for generating, transferring and confining particles in the vacuum system. In some non-limiting examples, the particles may include any species of neutral atoms, such as Rb, Cs, K, Fr, Na, Ho, Sr, Tb, Ca, and so on, or combinations thereof. However, systems and methods of the present invention are not limited to alkalis or atomic particles, and can be applied to any particles suitable for optical confinement. In some aspects, the particle system 110 can be configured with capabilities for cooling the particles to any desired temperatures, in order to facilitate trapping. For instance, the particle system 110 may include a laser for cooling the particles to temperatures in a range between 10 nanoKelvin and 100 microKelvins, although other values are also possible. Alternatively, the optical source 102 may be used for this purpose. Additionally, the particle system 110 may also include various optical elements to facilitate projection of generated light fields onto the particles therein.

To perform any quantum computation, quantum particles or qubits must be localized so that they can be measured and manipulated in a controlled way. For example, optical dipole traps use the Stark effect to create a potential well using focused light, which is detuned from an atomic transition. If the light is red-detuned (i.e., the photon has lower energy than the atomic transition), then the atoms are attracted to the maximum intensity of light. It is possible to create a red-detuned dipole trap by focusing a Gaussian beam; atoms will be attracted to the highest intensity at the focus.

It is also possible to create blue-detuned (i.e., the photon has higher energy than the atomic transition) optical traps. Blue-detuned optical traps require a more complex structured light field or focus than red-detuned traps because the atom needs to be surrounded by high intensity light in order for it to be contained. It is possible to use a bottle beam, focused Gaussian beams, or cross-hatched linear foci to create a local intensity minimum and create a blue-detuned optical trap, or by other means as disclosed in U.S. Pat. No. 10,559,932.

For quantum computing and simulation applications, an array of such red- or blue-detuned optical traps are used to trap a large number of atoms. Such techniques are readily extendable to thousands of atom traps using efficient means to create the optical fields.

The particle system 110 is configured to provide an ordered array comprising a multiplicity of quantum particles or qubits 112. A multiplicity of quantum particles or qubits comprises at least two quantum particles or qubits, but may suitably be any number of quantum particles or qubits more than two. In some embodiments, the multiplicity of quantum particles or qubits is at least 10, 50, 100, 500, 1000, or more quantum particles or qubits. The quantum particles or qubits may be any of the quantum particles or qubits described herein.

The ordered array may be a one-, two-, or three-dimensional ordered array. The positioning of the quantum particles or qubits within the ordered array may any suitable arrangement. For example, a one-dimensional array may suitably have quantum particles or qubits in an evenly spaced arrangement. For another example, a two-dimension array may suitably have quantum particles or qubits arranged in a square or hexagonal arrangement. For yet another example, a three-dimensional array may suitably have quantum particles or qubits arranged in a cubic or close-packing arrangement. These and other arrangements are within the scope of the invention.

The system may comprise one or more controllers. Referring again to FIG. 1, the system 100 may comprise an SLM controller 114, an optical source controller 118, a particle source controller 120, or any combination thereof. In general, a controller may receive a signal from a source, e.g., detector 116, and provide one or more signals to a component of the system to control the particular component, such as the SLM 106, the optical source 102, or the particle source 110. In some implementations, a controller may also control various other equipment of the system 100, such as various pumps, valves, and so forth. Suitably, the system 100 may comprise a different controller for each of the components, but that need not be the case. A controller may control at least two different components or even all of the components of the system 100.

A controller may include a programmable processor or combination of processors, such as central processing units (CPUs), graphics processing units (GPUs), Field Programmable Gate Arrays (FPGAs), Application-Specific Integrated Circuits (ASICs) and the like. As such, the controller may be configured to execute instructions stored in a non-transitory computer readable-media. In this regard, the controller may be any computer, workstation, laptop or other general-purpose computing device. Additionally or alternatively, the controller may also include one or more dedicated processing units or modules that may be configured (e.g. hardwired, or pre-programmed) to carry out steps, in accordance with aspects of the present disclosure.

In an embodiment of the invention, the system 100 comprises a SLM controller 114. The SLM controller is configured to receive a signal from a source and provide one or more signals to the SLM to control the SLM. The signal provided by the SLM controller to the SLM may include one or more signals configured to modulate the structured illumination pattern. Where the SLM comprises an amplitude modulator, the control signal may induce a change in the projected amplitude, thereby projecting a structured illumination pattern. Likewise, where the SLM comprises a phase modulator, the control signal may induce a change in the projected phase, thereby projecting a structured illumination pattern.

In embodiments where the SLM comprises two or more different SLMs, such as hologram projector and an intensity transmission mask, the SLM controller 114 may be configured to provide signals to each of the different components. In other embodiments, the SLM controller may comprise two or more different controllers configured to provide signals to the two or more different SLMs.

The SLM controller may be configured to modulate the structured illumination pattern to induce a desired effect. In some aspects, the SLM controller may be configured to induce qubit operation, simultaneously address two or more quantum particles or qubits of the ordered array, induce a change in the a profile of the structured illumination pattern incident on the individually addressed one or more quantum particles or qubits, correct an optical aberration, transport one or more quantum particles or qubits across the ordered array, induce a quantum state transition in one or more quantum particles or qubits in the ordered array, induce a change in a quantum state transition frequency in one or more quantum particles or qubits in the ordered array, induce a phase shift in one or more quantum particles or qubits in the ordered array, induce a rotation in one or more quantum particles or qubits in the ordered array, or any combination thereof. Suitably, the SLM controller is configured to modulate the structured illumination pattern to induce two or more desired effect, including two or more of any of the foregoing. For example, the SLM controller may be configured to induce a qubit operation and, additionally, correct an optical aberration, induce a change in the profile of the structured illumination pattern, simultaneously address two or more sites of the ordered array, transport one or more quantum or any combination thereof. For another example, the SLM controller may be configured to correct an optical aberration and induce a change in the profile of the structured illumination pattern and, optionally, induce a qubit operation, transport one or more quantum particles or qubits across the ordered array, induce a quantum state transition in one or more quantum particles or qubits in the ordered array, induce a change in a quantum state transition frequency in one or more quantum particles or qubits in the ordered array, induce a phase shift in one or more quantum particles or qubits in the ordered array, induce a rotation in one or more quantum particles or qubits in the ordered array, or any combination thereof.

The SLM controller 114 may be used to obtain a more faithful far-field distribution by allowing phase variations between the addressed lattice sites because many qubit addressing applications are only sensitive to the intensity of the control beam. The SLM controller may be configured to execute a set of instruction for such purpose. Exemplary algorithms for preparing such beams include error diffusion dithering, iterative Fourier transform algorithms, direct binary searches, or genetic algorithms.

One such algorithm is the Gerchberg-Saxton algorithm. When comparing the weighted Gerchberg-Saxton algorithm to binary rounding, simulations show a much more even distribution of power among the target lattice sites (standard deviation 0.003%). Some untargeted lattice sites were still illuminated (as much as 15% of the mean target site), giving rise to unacceptable intensity crosstalk.

One strategy to reduce this crosstalk is to use other algorithms similar to Gerchberg-Saxton that use relaxation of additional far-field parameters (e.g., mixed-region amplitude freedom, MRAF, algorithm). Other techniques can be used to reduce this unwanted light, for example, a second SLM (or an unused segment of the first SLM) can be used in conjunction with a spatial filter to greatly attenuate diffraction artifacts. When using a digital micromirror device, micromirrors not corresponding to particle trap sites can be turned to the off position. Alternatively, when using a liquid crystal SLM, high-frequency holograms can deflect light not in the targeted trap sites at high angles which can be removed by spatial filtering. Such techniques can be used to efficiently address one site, multiple sites, and the entire array. Using a hybrid holographic-projection mode approach, crosstalk can be vastly suppressed without greatly changing the system efficiency.

Again referring to FIG. 1, the system 100 may optionally comprise a detector 116. The detector 116 may be used to interrogate the system and detect one or more different properties. The detected property may be communicated to one or more SLM controller 114, optical source controller 118, particle source controller 120, I/O device 112, or any combination thereof.

In some embodiments, the detector 116 may be used to interrogate the structured illumination pattern 108. Suitably, the detector 116 may be capable of detecting one or more properties of the structured illumination pattern. The detected properties may include a spatial intensity profile, beam profile, maxima of intensity, beam width, beam quality, beam divergence, beam astigmatism, beam jitter, and so forth. Suitably, the detector may be a beam profiler, wavefront sensor, charge-coupled device (CCD), and the like.

In some embodiments, the detector 116 may be used to interrogate the quantum particles or qubits 112. Suitably, the detector may be configured to determine the states of the quantum particles or qubits 112 within the particle system 110. The detector 116 may include various hardware components for generating or detecting a probe signal for interrogating the quantum particles or qubits. The probe signal generated by the detector may be same or different than the detected probe signal depending on application. In some embodiments, the probe signal may be generated by a laser capable of producing light with a desired wavelength. The wavelength may be in an ultraviolet, visible, near-infrared, infrared, or microwave range, but need not be. Suitably, the light is between approximately 200 nm and approximately 5 mm, although other wavelengths are possible. In some embodiments, the probe signal may be detected a photodetector. Photodetectors include photoemission detectors, photoelectric detectors, thermal detectors, polarization detectors, photochemical, and the like. Examples include, photomultiplier tubes, phototubes, microchannel plates, CCDs, photoresistors, photodiodes, photovoltaic detectors, pyroelectric detectors, and so forth.

In some embodiments, the detector 116 is configured to interrogate the structured illumination pattern 108 and the quantum particles or qubits 112. Suitably, the detector 116 may comprises two or more different detectors configured to interrogate the structured illumination pattern 108 and the quantum particles or qubits 112.

Figure 5:
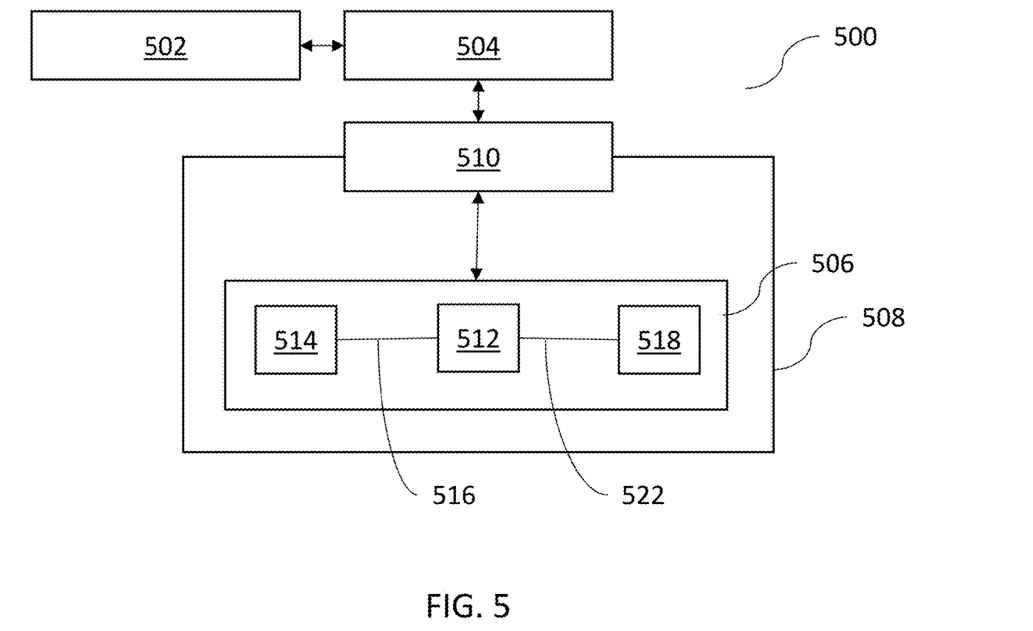
FIG. 5 illustrates a quantum computing system.

Turning now to FIG. 5, an example quantum computing system 500 for use in quantum information processing or quantum computation, in accordance with the present disclosure, is shown. The quantum computing system may comprise any of the systems for the optical control of a quantum particle or qubit as described herein and further a readout system for providing a quantum computation result.

In some embodiments, the system 500 may include a controller 502 and signal input/output (I/O) hardware 504 in communication with the controller 502. The system 500 may also include one or more quantum processors 506 contained in a housing unit 508, where the quantum processor(s) 506 is configured to perform a variety of quantum computations or quantum information processing. In addition, the system 500 may also include various interface hardware 510 for communicating and controlling signals between the signal I/O hardware 504 and the quantum processor(s) 506.

The signal I/O hardware 504 may various electronic systems, hardware and circuitry capable of a wide range of functionality. In general, the controller 502 may direct the signal I/O hardware 504 to provide various signals to the quantum processor(s) 506, as well as detect signals therefrom via the interface hardware 510. In some implementations, the controller 502 may also control various other equipment of the system 500, such as various pumps, valves, and so forth. In some aspects, the controller 502 may include a programmable processor or combination of processors, such as central processing units (CPUs), graphics processing units (GPUs), Field Programmable Gate Arrays (FPGAs), Application-Specific Integrated Circuits (ASICs) and the like. As such, the controller 502 may be configured to execute instructions stored in a non-transitory computer readable-media. In this regard, the controller 502 may be any computer, workstation, laptop or other general purpose or computing device. Additionally, or alternatively, the controller 602 may also include one or more dedicated processing units or modules that may be configured (e.g. hardwired, or pre-programmed) to carry out steps, in accordance with aspects of the present disclosure.

The housing unit 508 is configured to control the environment to which the quantum processor(s) 506 is exposed. The housing unit 508 contains the qubits therein and may optionally include one of more components of the system for the optical control of a quantum particle or qubit described herein, including, without limitation, an optical source, a SLM, a particle system, any of the controllers associated therewith, or a detector. The housing unit 508 may also include various components and hardware configured to control the temperature of the quantum processor(s) 508, as well as the liquid and/or gas mixture surrounding the quantum processor(s) 508. In addition, the housing unit 508 may also be configured to control external noise signals, such as stray electromagnetic signals. To this end, the housing unit 508 may include various shielding units and filters. By way of example, the housing unit 508 may be temperature controlled, or include, or be part, of a cryostat or other low-temperature system.

The interface hardware 510 provides a coupling between the signal I/O hardware 604 and the quantum processor(s) 606, and may include a variety of hardware and components, such as various cables, wiring, radio-frequency elements, optical fibers, heat exchangers, filters, amplifiers, motion stages, and so forth.

Figure 6:
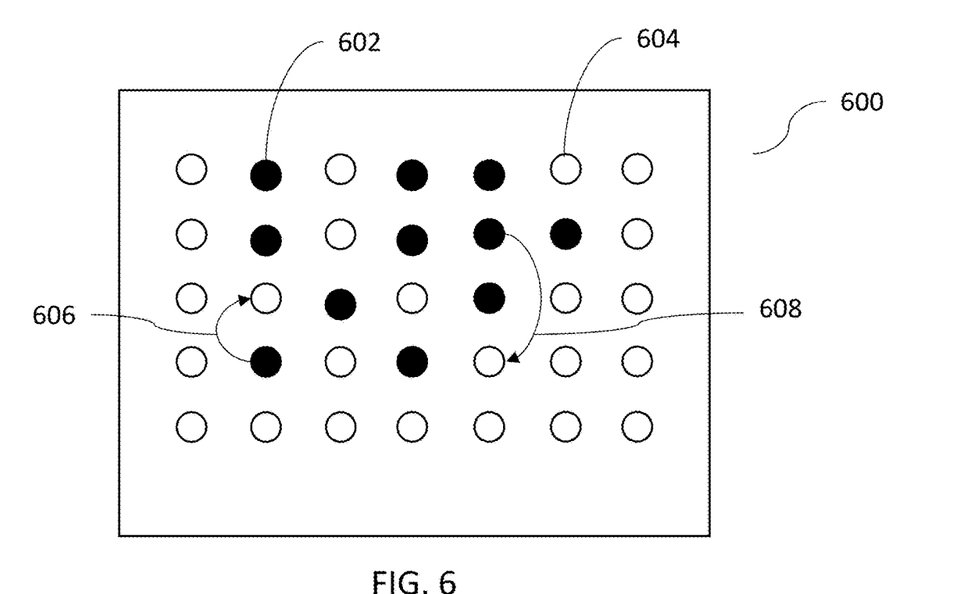
FIG. 6 illustrates quantum particle or qubit transport.

As shown in FIG. 6, the Quantum processor(s) 606 may include a qubit architecture 512 connected to control system 514 by way of various control coupling(s) 516. The qubit architecture 512 may include the ordered array comprising a multiplicity of qubits. In some implementations, the qubit architecture 512 may include one or more neutral atoms. However, the qubit architecture 512 may include other qubit types.

The control system 514 may be in communication with the signal I/O hardware 504 and configured to control qubits in the qubit architecture 512 by providing various control signals thereto. This may be accomplished using by way of the signal I/O hardware 504, which as directed by the controller 502. The control system 514 may comprise any of the optical sources, SLMs, or respective controllers described herein. Suitably, the control system 514 is capable of generating a structured illumination pattern configured to induce one or more qubit operations.

The qubit architecture 512 may also be connected to a readout system 518 via readout coupling(s) 522. The readout system 518 may be configured to perform readout on qubits in the qubit architecture 512, and provide corresponding signals to the signal I/O hardware 604. The readout system 518 in communication with the qubit architecture 512 may be configured to provide readout information in relation to controlled quantum states of the qubit architecture 512, in accordance with the present disclosure. Suitably, a report may be generated of any shape or form comprising the quantum computation result. Specifically, information with respect to states of the qubits may be obtained via signals from single or multiple readouts by way of the readout system 518.

The techniques described herein have wide application to a number of quantum particle and qubit control protocols. By way of example, the use of the SLM for individually addressing quantum particles or qubits will be further described below.

The systems and methods described herein may be used to perform Raman gates. These gates may be used to perform site-specific qubit rotations. Targeted atoms are illuminated with light of two frequencies detuned from an atomic transition. If the difference of the two frequencies is tuned to the energy splitting between $|0\rangle$ and $|1\rangle$ qubit states, the targeted atoms will transfer their population between the two states. Relevant wavelengths for cesium atoms include, but are not limited to, 852, 894, 455, 459, and 685 nm. Relevant wavelengths for rubidium atoms include, but are not limited to, 780, 794, and 421 nm. Other atomic species used for qubits can be controlled in a similar fashion using different wavelengths appropriate for that atomic species.

The systems and methods described herein may be used to perform Stark-shifted microwave rotations. These gates can also be used to accomplish site-specific qubit rotations. Microwaves tuned to the energy splitting between $|0\rangle$ and $|1\rangle$ states will induce population rotations. By addressing targeted atoms with light detuned from an atomic transition, the energy splitting between $|0\rangle$ and $|1\rangle$ changes due to the Stark effect. This will shift targeted sites out of resonance with the microwave transition, resulting in all atoms in the lattice undergoing rotations except those in the targeted sites. Alternately, by tuning the microwave frequency to the Stark-shifted energy difference of the two qubit states, it is possible to induce population transfer on targeted sites only.

The systems and methods described herein may be used to perform Stark-shifted Z-gates. The gates described above transfer population between the two qubit states, but it is often desirable to induce a phase shift between the two qubit states without any population transfer. This can be accomplished by illuminating targeted sites with light detuned from an atomic transition. The Stark effect results in the targeted sites accumulating a phase with respect to the rest of the atoms in the lattice. By combining these techniques with microwave pulses, it is possible to use this gate to achieve state-selective microwave transfer as well.

The systems and methods described herein may be used to perform Rydberg excitations. Excitation to a Rydberg state is an important step in many two-qubit, neutral atom quantum gates. This excitation can be accomplished through a single-photon excitation, a two-photon, or a three-photon excitation. Such excitations can be reached through resonant driving, adiabatic rapid passage, stimulated Raman adiabatic passage, or by using pulses with specially designed temporal envelopes to increase gate fidelity. SLMs can be used to selectively excite atoms to Rydberg states using any of these optical methods.

Using SLMs it is possible to illuminate both control and target atom simultaneously for some gate protocols. By targeting multiple atoms outside of the blockade radius, multiple atoms can be simultaneously driven to the Rydberg state. It is also possible to use multiple wavelengths for cross-species gates as described in FIG. 4. Both species can be simultaneously illuminated with all wavelengths. The first species (e.g., cesium) will be excited to the Rydberg state by one set of wavelengths while the second species (e.g., rubidium) will be excited by the second set of wavelengths.

The SLM techniques described above also have wide application to a number of atom-trapping techniques. In addition to the methods describe therein, an SLM may be used to pattern the light in a form suitable for trapping. It is also possible to use SLM techniques to transport atoms for various quantum protocols. In most common particle trap loading techniques, quantum particles or qubits cannot be loaded into traps with perfect efficiency. One solution to this problem is to use an SLM to create optical potentials that move atoms from occupied traps into new occupied traps in a desired configuration. Transport of the quantum particle or qubit may be accomplished in any desired direction.

Referring to FIG. 6, quantum particles or qubit in an array of trap sites that is partially occupied can be rearranged to give a smaller region that is fully occupied. The ordered array 600 may comprises occupied sites 602 and unoccupied sites 604, represented by filled and unfilled circles, respectively. The particles in the occupied sites 602 may be rearranged to give a smaller region that is more fully occupied. In some instances, the quantum particle or qubit may be transported from an occupied to unoccupied site with an allowed atom movement that does not collide with other occupied sites 606.

One method for transporting quantum particles or qubits uses structured illumination pattern projected by a SLM is restrict to motion in the plane of the array of trapping sites. As mentioned above, it is possible to create a set of red-detuned traps using an SLM. This can be accomplished by calculating a set of holograms using a spatial light modulator which continuously moves atoms from the initial configuration of occupied traps to the desired configuration. All of the sites can move in parallel so long as trap sites do not overlap each other. Relevant wavelengths include a multitude of possible values in the visible and infrared parts of the optical spectrum.

Other movements may be considered forbidden because an in-plane translation of the quantum particle or qubit would collide with an occupied site. This movement can be accomplished without a collision using axial transport perpendicular to the plane of the trap array. In addition to the transverse atom rearrangement described above, it can also be advantageous to move atoms axially, along a direction perpendicular to the plane of the trap array. This is useful for allowing movement from an initial trap site to a target trap site without colliding with an atom in an occupied trap site in between. This is also useful for transporting atoms from a separate source region into the array of traps.

These translations may be accomplished in two distinct ways. An SLM can be used to add defocus to an atom trap, which will shift the focus, thus shifting the trap. Another way involves illuminating the atom with counter-propagating beams of light with the same frequency. Two such counter-propagating beams form a standing wave. When the frequency of one of the beams is changed, the standing wave moves, carrying the atom along with it. The beam is returned to its original frequency to halt the atom transportation. Another approach is to use lenses with a focal length that can be rapidly changed in order to move the focus of a trapping beam in an axial direction. This includes zoom lenses with fast mechanical adjustment of the zoom parameters and liquid lenses that have focal lengths that are rapidly controllable using an electronic voltage. For all of these approaches it is possible to move several trapped atoms axially in parallel. Relevant wavelengths include a multitude of possible values in the visible and infrared parts of the optical spectrum.

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for the optical control of a quantum particle or qubit, the system comprising:
   (a) a particle system configured to provide an ordered array comprising a multiplicity of quantum particles or a multiplicity of qubits;
   (b) an optical source, the optical source configured to generate a beam of light;

(c) a spatial light modulator positioned along an optical train between the optical source and the ordered array, the spatial light modulator configured to project a structured illumination pattern capable of individually addressing one or more quantum particles or qubits of the ordered array; and (d) a spatial light modulator controller, the spatial light modulator controller configured to modulate the structured illumination pattern, wherein the spatial light modulator comprises a hologram projector and an intensity transmission mask.

2. The system of claim 1, wherein the spatial light modulator comprises a segmented spatial light modulator having a first segment comprising the hologram projector and a second segment comprising the intensity transmission mask.

3. The system of claim 2, wherein the hologram projector is configured to project a holographically-structured illumination pattern and the intensity transmission mask is configured to filter the first structured illumination pattern.

4. The system of claim 1, wherein the spatial light modulator controller is configured to modulate the structured illumination pattern to:
(i) induce a qubit operation;
(ii) simultaneously address two or more quantum particles or qubits of the ordered array;
(iii) induce a change in a profile of the structured illumination pattern incident on the individually addressed one or more quantum particles or qubits;
(iv) correct an optical aberration;
(v) transport one or more quantum particles or qubits across the ordered array;
(vi) induce a quantum state transition in one or more quantum particles or qubits in the ordered array;
(vii) induce a change in a quantum state transition frequency in one or more quantum particles or qubits in the ordered array;
(viii) induce a phase shift in one or more quantum particles or qubits in the ordered array;
(ix) induce a rotation in one or more quantum particles or qubits in the ordered array; or
(x) any combination thereof.

5. The system of claim 4, wherein the spatial light modulator controller is configured to modulate the structured illumination pattern to induce a change in a profile of the structured illumination pattern incident on the individually addressed one or more quantum particles or qubits.

6. The system of claim 4, wherein the spatial light modulator controller is configured to modulate the structured illumination pattern to correct an optical aberration.

7. The system of claim 4, wherein the wherein the spatial light modulator controller is configured to modulate the structured illumination pattern to induce a qubit operation.

8. The system of claim 1 further comprising an acousto-optic modulator, an electro-optic modulator, a detection device, or any combination thereof.

9. A quantum computing system comprising the system of claim 1 and further comprising a readout system for providing a quantum computation result,
wherein the ordered array comprises the multiplicity of qubits, and
wherein the spatial light modulator controller is configured to modulate the structured illumination pattern to induce a qubit operation.

10. A method for optically controlling a quantum particle or a qubit, the method comprising:
(a) generating, with an optical source, a beam of light;

(b) projecting, with a spatial light modulator positioned along an optical train between the optical source and an ordered array comprising a multiplicity of quantum particles or a multiplicity of qubits, a structured illumination pattern capable of individually addressing one or more quantum particles or qubits of the ordered array; and (c) modulating, with a spatial light modulator controller, the structured illumination pattern, wherein the wherein the spatial light modulator comprises a hologram projector and an intensity transmission mask.

11. The method of claim 10, wherein the spatial light modulator comprises a segmented spatial light modulator having a first segment comprising the hologram projector and a second segment comprising the intensity transmission mask.

12. The method of claim 11 further comprising projecting, with the hologram projector, a holographically-structured illumination pattern and filtering, with the intensity transmission mask, the holographically-structured illumination pattern.

13. The method of claim 10, wherein modulating the structured illumination pattern:
(i) induces a qubit operation;
(ii) simultaneously addresses two or more quantum particles or qubits of the ordered array;
(iii) induces a change in a profile of the structured illumination pattern incident on the individually addressed one or more quantum particles or qubits;
(iv) corrects an optical aberration;
(v) transports one or more quantum particles or qubits across the ordered array;
(vi) induces a quantum state transition in one or more quantum particles or qubits in the ordered array;
(vii) induces a change in a quantum state transition frequency in one or more quantum particles or qubits in the ordered array;
(viii) induces a phase shift in one or more quantum particles or qubits in the ordered array;
(ix) induces a rotation in one or more quantum particles or qubits in the ordered array; or
(x) any combination thereof.

14. The method of claim 13, wherein the spatial light modulator controller is configured to modulate the structured illumination pattern to induce a change in a profile of the structured illumination pattern incident on the individually-addressed one or more quantum particles or qubits.

15. The method of claim 13, wherein the spatial light modulator controller is configured to modulate the structured illumination pattern to correct an optical aberration.

16. The method of claim 13, wherein modulating the structured illumination pattern induces a qubit operation.

17. The method of claim 16, wherein the ordered array of quantum particles or qubits comprises at least two different neutral atoms and modulating the structured illumination pattern induces a qubit operation on one of the different neutral atoms.

18. A method for performing a quantum computation comprising the method of claim 10 and further comprising providing, with the readout system, a quantum computation result,
wherein the ordered array comprises the multiplicity of qubits, and wherein modulating the structured illumination pattern induces a qubit operation.

* * * * *